United States Patent [19]

Hall et al.

[11] 4,088,241

[45] May 9, 1978

[54] IMPACT RESISTANT SEAL FOR GASOLINE TANK

[75] Inventors: John F. Hall, Bloomfield Hills; Donald C. MacDonald, Rochester; Frank R. Holliday, Birmingham, all of Mich.

[73] Assignee: Chrysler Corporation, Highland Park, Mich.

[21] Appl. No.: 715,962

[22] Filed: Aug. 19, 1976

[51] Int. Cl.² ............................................. B65D 25/20
[52] U.S. Cl. ....................................... 220/86 R; 16/2; 277/178; 277/206 R; 277/212 F; 285/162
[58] Field of Search ............. 220/86 R, 278; 277/178, 277/206 R, 212 R, 212 C, 212 F, 212 FB, DIG. 2; 16/2; 285/162, 159, 192

[56] References Cited

U.S. PATENT DOCUMENTS

| | | | |
|---|---|---|---|
| 2,779,498 | 1/1957 | Cole et al. | 220/86 R |
| 2,806,080 | 9/1957 | Corey | 16/2 |
| 2,897,533 | 8/1959 | Bull et al. | 16/2 |
| 2,936,933 | 5/1960 | Malec | 277/178 |
| 3,010,518 | 11/1961 | Harmon | 277/212 |
| 3,109,662 | 11/1963 | Bergstrom | 277/206 |
| 3,244,802 | 4/1966 | Sturtevant | 16/2 |
| 3,506,155 | 4/1970 | Auer | 220/86 R |
| 3,915,491 | 10/1975 | Montgomery | 277/178 |
| 3,995,332 | 12/1976 | Forchini | 277/178 |

Primary Examiner—George E. Lowrance
Assistant Examiner—Allan N. Shoap
Attorney, Agent, or Firm—Baldwin & Newtson

[57] ABSTRACT

A resiliently deformable crash resistant seal is provided between an automobile gasoline tank and a filler tube for the tank, wherein the filler tube may freely slide axially with respect to the seal without disrupting the latter or rupturing any fixed connection between the tank, tube and seal.

11 Claims, 5 Drawing Figures

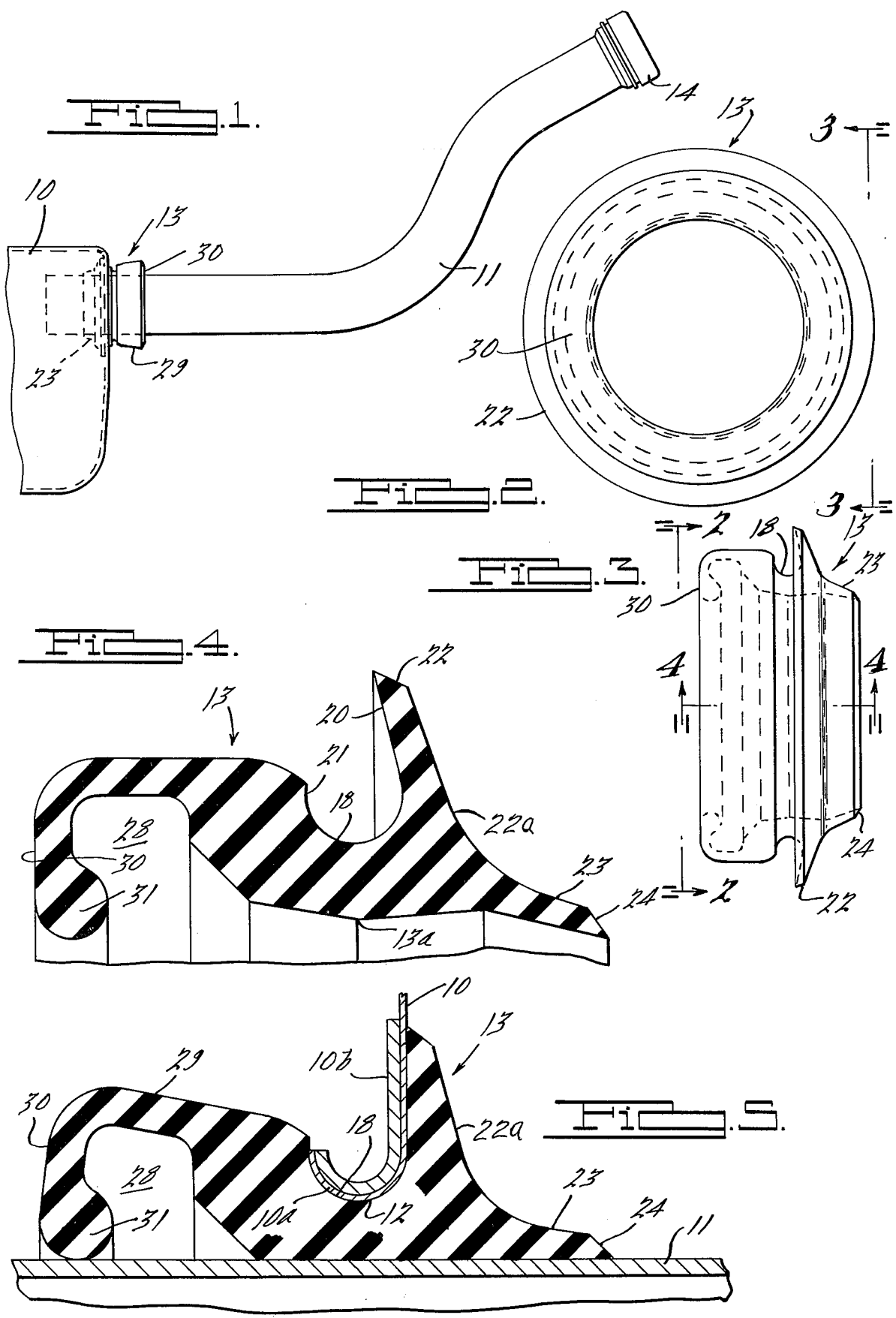

IMPACT RESISTANT SEAL FOR GASOLINE TANK

BACKGROUND AND SUMMARY OF THE INVENTION

In a conventional automobile construction, a filler tube for the gasoline tank extends through an opening in the tank. A seal is provided around the tube between the latter and the tank. The present invention relates to improvements in such a seal that may be readily installed in sealing engagement with the tube and tank and that is highly resistant to leakage in the event of deformation of the tank or tube or relative displacement resulting from collision, such as a rear end collision when the fill opening is at the rear of the tank.

Another object is to provide such a seal comprising a resiliently deformable material arranged coaxially around the tube and having two cooperating pairs of sealing areas in fluid sealing engagement with the tank and tube.

One pair of the sealing areas comprises an annular body portion of the deformable material having its radially inner and outer circumferential portions deformed and clamped respectively between the tube and the portions of the tank around said opening to effect the seal. The diameter of the inner circumferential portion of the body in its undeformed condition is less than the outer diameter of the tube. The diameter of the outer circumferential portion in the undeformed condition is greater than the diameter of the tank opening and defines the base of a radially outwardly opening annular groove coaxial with the body and having said portions of the tank around its opening confined therein. Thus the radially inner and outer annular portions of the deformable body are resiliently deformed and pressed toward each other between the tube and tank to effect the seal.

The aforesaid annular groove is defined by axially spaced interior and exterior sides, the interior side extending radially outwardly beyond the exterior side and being inclined toward the latter in the undeformed condition to effect an annular radial seal having an interference fit with the interior wall of the tank around said opening. Also extending into the tank around the tube from the radial seal is a tubular seal of endwise decreasing diameter in the undeformed condition less than the external diameter of said tube to effect an interference fit and sealing engagement therewith. The tubular and radial seals comprise the second pair of sealing areas and are sufficiently thin and flexible to yield readily against said tube and interior wall of the tank respectively when subject to the fluid pressure in the tank, thereby to increase the sealing engagement as the fluid pressure increases.

Other objects are to provide such a seal having an annular liquid fuel entrapping channel located axially outward of said groove, and to provide such a seal in combination with a filler tube that extends generally from rear to front through the tank opening and being thereby freely slidable axially or from rear to front through the seal without rupturing the latter in the event of a light to moderate rear end collision.

Other objects of this invention will appear in the following description and appended claims, reference being had to the accompanying drawings forming a part of this specification wherein like reference characters designate corresponding parts in the several views.

FIG. 1 is a small scale fragmentary side view taken parallel to the longitudinal (front to rear) vertical midplane of an automobile, showing the orientation of the gasoline tank and filler tube embodying the seal of the present invention.

FIG. 2 is an enlarged rear end view of the seal from its exterior and showing the seal removed from the fuel tank and filler tube.

FIG. 3 is a side elevational view of the seal of FIG. 2.

FIG. 4 is an enlarged fragmentary mid-sectional view taken in the direction of the arrows 4—4 of FIG. 3.

FIG. 5 is a view similar to FIG. 4, showing the seal in its deformed condition assembled with the tank and filler tube.

It is to be understood that that invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, FIG. 1 shows an automobile gasoline tank 10 and a typical filler tube 11 assembled therewith. The tube 11 extends horizontally from rear to front through an opening 12 in the rear wall of the tank 10 and the seal 13 embodying the present invention is provided between the tank 10 and tube 11 at the opening 12. The exterior end of the tube 11 is closed by a conventional removeable cap 14 and the interior end opens into the tank 10 below the fuel level when the tank 10 is full.

Details of the seal 13 in its undeformed condition are illustrated in FIGS. 2, 3 and 4. FIG. 5 shows portions of the filler tube 11 and tank 10 assembled with the seal 13 to illustrate the extent of its normal deformation after assembly. The seal 13 comprises an annular body of resiliently deformable elastomeric material having annular groove 18 in its outer periphery opening radially outwardly to receive a portion of the tank 10 around the opening 12 in the tank. The base of the groove 18 is rounded as illustrated to receive a rounded reinforcing flange 10a of the tank 10 that defines the opening 12. An annular reinforcing ring or grommet 10b conforming to the shape of the tank portion 10a may also be secured to the latter. The groove 18 has an undeformed minimum diameter greater than the minimum inner diameter of the annular flange 10a to effect an interference fit and fluid sealing engagement between these parts, FIG. 5.

Radially inwardly of the minimum diameter of the base of groove 18, the undeformed diameter of the seal 13 at 13a is somewhat less than the outer diameter of the tube 11 to effect an interference fit and sealing engagement therewith in the assembled condition. From the region 13a, the inner diameter of the seal 13 enlarges in both axial directions so that a localized concentration of compressive force is exerted on the seal 13 in the assembled condition at the base of the groove 18 to effect optimum sealing and at the same time to facilitate assembly of the seal 13 with the tank 10 and tube 11 without recourse to undue force that would otherwise be required if the body of the seal 13 had a uniform small internal diameter.

The groove 18 is defined by axially spaced annular interior and exterior sides or seals 20 and 21 respectively, the interior side 20 being within the tank 10 and converging axially and radially outwardly toward the exterior wall 21 in the undeformed condition. When assembled, the interior wall 20 lies flush in fluid sealing engagement with the interior wall of the tank 10 at an interference fit. The interior side 20 thus comprises an annular seal and extends radially outwardly beyond the side 21 for a distance approximately equal to the radial dimension of the side 21. The annular seal 20 is also sufficiently thin axially and flexible to be readily urged by the fluid pressure in the tank 10 against the adjacent interior wall of the latter around the opening 12, thereby to conform closely to the interior of the tank 10 and increase the sealing effectiveness. In this regard, the flexibility of the outer periphery of the seal 20 is increased by the chamfer 22.

The interior end of the annular body of the seal 13 comprises a thin flexible tubular seal 23 in fluid sealing engagement with the outer periphery of the tube 11 at an interference fit. The thickness and axial length of the seal 23 is comparable to the thickness and radial length of the seal 20. The internal diameter of the seal 23 decreases axially endwise in the undeformed condition from a maximum that is slightly greater than the external diameter of the tube 11 to a minimum at its axial end somewhat less than the minimum diameter of the sealing region 13a. Also similarly to the seal 20, the seal 23 is sufficiently flexible to yield readily against the tube 11 when subject to the fluid pressure in the tank 10, thereby to increase the sealing engagement between the seal 23 and tube 11 as the fluid pressure exerted against the seal 23 increases. The axial end of the seal 23 is also chamfered at 24 to increase its flexibility and sealing effectiveness.

Axially outward of the groove 18 and side 21, the annular body of the seal 13 is provided with a radially inwardly opening annular fuel entrapping channel 28 having a comparatively thin flexible base 29 and an annular endwall 30 which extends radially inwardly in the non-deformed condition to a smaller diameter than the outer diameter of the tube 11 to effect an interference fit and sealing engagement therewith. The wall 30 terminates radially inwardly in an annular enlargement 31 rounded in cross-section at its region of engagement with the tube 11. Thus in the event of an impact and a momentary leakage of fuel through the tubular seal 23 and sealing region 13a, fuel will be trapped within the channel 28. If the leakage is not excessive, the fuel entrapped within the channel 28 will be absorbed in part by the body of the seal 13 and will thereafter be gradually dissipated to the atmosphere by leakage in a vapor phase.

By virtue of the structure described, in the event of a rear end collision, the tube 11 can slide axially along the seals 31, 23 and 13a without disrupting the same or rupturing any fixed connection with the tank 10. Likewise the rear end of the tube 11 may be cocked to an appreciable extent angularly with respect to its normal axis without causing leakage. In such an event the annular body of the seal 13 at either axial side of its thickest and most rigid portion in the plane of the annular restriction 13a is readily deformable to conform to the angularly cocked tube 11 without unduly deforming the tank 10 or disrupting the seal effected at 18 and 20. In the latter regard, the reinforcing ring or grommet 10b prevents excessive deformation of the thin metal of the tank 10 around the opening 12, which deformation would allow leakage at the sealing surfaces 18 and 20 at high tank pressures.

Although the seal 13 is especially desirable for use with a filler tube 11 extending coaxially through the opening 12 in the rear wall of the tank 10 as illustrated, the invention is not limited to such use. The seal 13 may be employed advantageously with other than rear fill openings, as for example a side fill opening where the filler tube 11 enters the tank 10 through a side opening that is otherwise comparable to the opening 12. In any event, by reason of the capability of the seal 13 to accommodate cocking of the filler tube 11 out of coaxial alignment without leaking, the tube 11 may also be employed in an alternate construction at an appreciable angle to the seal axis where required by the geometry of the vehicle body.

Also the present construction facilitates assembly by reason of a) the shallow annular interiorly opening channel 22a of arcuate longitudinal section, FIG. 4, connecting the chamfered ends 22 and 24, b) the seal 20 inclined toward the wall 21, and c) the exterior channel 28. A section of the base of the latter channel 28 can be readily clamped by a tool prior to assembly of the seal 13 with either the tube 11 or tank 10, whereby the seal may then be forced edgewise, i.e. transversely to the major annular axis, completely through the opening 12 into the tank 10. The arcuate portion 22a between the chamfers 22 and 24 facilitates camming of the deformable seal to an out-of-round condition as it passes interiorly through the opening 12, and the outwardly inclined seal 20 readily yields outwardly as the seal 13 is forced into the tank 10. Thereafter the channel 28 may be pulled outwardly through the opening 12 until the flange 10a seats within the groove 18.

The outwardly inclined seal 20 readily yields outwardly to a limited extent as aforesaid to facilitate insertion of the seal 13 into the tank 10, but when an outward pull is thereafter exerted on the seal 13 by an outward pull on the channel 28, the seal 20 will only yield readily limited extent inwardly and away from the wall 21 until the flange 10a seats within the groove 18. Thereafter the seal 20 effectively resists further inward yielding. The tube 11 may then be inserted through the central opening of the seal 13 to the FIG. 1 position to complete the assembly.

We claim:

1. An impact resistant seal comprising a tubular body of resiliently deformable material for use between a portion of an automobile gasoline tank around an opening therein and a filler tube extending into said tank through said opening, said tubular body having a passage therethrough of variable diameter along its axis and also having an interior end comprising a flexible tubular seal converging endwise to effect an interference fit and fluid sealing relationship with the outer periphery of said tube within said tank, the outer periphery of said body having an annular groove defined by axially spaced interior and exterior sides of said groove and opening radially outwardly for receiving said tank portion therein in fluid sealing relationship around said opening, said interior side extending radially outwardly beyond said exterior side and comprising a flexible annular seal converging radially outwardly toward said exterior side to effect an interference fit and fluid sealing relationship with the interior wall of said tank around said opening, said tubular and annular seals being readily yieldable against said tube and said interior wall respectively when subject to the fluid pressure in said tank, thereby to increase said sealing relationship as said fluid pressure increases, the radial thickness of said tubular body at the region of said groove being greater than the axial thickness of said annular seal throughout the major radial extent of the latter, the axial thickness of said annular seal being comparable to the radial thickness of said tubular seal, and means for effecting an interference fit and sealing relationship between said tubular body and the outer periphery of said tube at the region of said groove and for concentrating the compressive force of said tube against said body opposite the base of said groove and cooperating with said flexible tubular and annular seals for enabling appreciable cocking of said tube out of alignment with the axis of said passage without impairing said sealing relationship when said body and tube are assembled together comprising the diameter of said passage being smaller than the diameter of the outer periphery of said tube throughout the axial extent of said groove and being a minimum at a location spaced axially between said sides of said groove and increasing in opposite axial directions at least to the axial locations of said sides.

2. In the combination according to claim 1, said annular seal having an annular surface for confronting the interior wall of said tank and having an opposite annular surface for facing into said tank, means for camming said annular seal toward said exterior side of said groove upon insertion of said tubular body edgewise through said opening in said tank comprising said opposite annular surface inclining radially outwardly toward said exterior side.

3. In combination, an automobile gasoline tank, a filler tube extending into said tank through an opening therein, an impact resistant seal between said tube and a portion of said tank around said opening, said seal comprising a tubular body of resiliently deformable material having a passage therethrough and being resiliently deformed from an undeformed condition by fluid sealing engagement with said tube and portion of said tank, one end of said body comprising a flexible tubular seal engaging the outer periphery of said tube in fluid sealing relationship within said tank, the outer periphery of said body having an annular groove opening radially outwardly and defined by axially spaced interior and exterior sides of said groove, said groove having said portion of said tank confined therein in fluid sealing relationship around said opening, said interior side extending radially outwardly beyond said exterior side and comprising a flexible annular seal engaging the interior wall of said tank around said opening in fluid sealing relationship, said tubular and annular seals being yieldable against said tube and interior wall respectively when subject to the fluid pressure within said tank to increase said sealing relationship as said fluid pressure increases, said tubular body having said undeformed condition prior to being assembled with said tank and tube, said tubular body in its undeformed condition being annular and the diameter of said passage throughout the axial extent of said groove being smaller than the diameter of the outer periphery of said tube and being a minimum at a location spaced axially between said sides of said groove and increasing in axially opposite directions from said minimum at least to the axial locations of said sides for effecting a localized annular region of maximum sealing force between said body and tube at the location of said minimum diameter and for cooperating with said flexible tubular and annular seals to enable appreciable cocking of said tube from axial alignment with said passage without impairing said sealing relationship.

4. In the combination according to claim 3, the axis of said filler tube at the region of its extension through said opening extending generally horizontally from front to rear with respect to said tank.

5. In the combination according to claim 4, said annular seal in its undeformed condition inclining toward said exterior side and being resiliently deformed axially away from said exterior side by said sealing engagement with the interior of said tank, the diameter of said passage through said tubular seal in its undeformed condition decreasing endwise, said tubular seal being resiliently deformed radially outwardly by said sealing engagement with said tube.

6. In the combination according to claim 5, the radial thickness of said body in the undeformed condition at the region of the base of said groove being greater than the axial thickness of said annular seal throughout the major portion of its axial extent, and the latter thickness being comparable to the corresponding radial thickness of said tubular seal.

7. In the combination according to claim 3, said portion of said tank around said opening bottoming in said groove at an interference fit effecting said fluid sealing relationship.

8. In the combination according to claim 3, said annular seal in its undeformed condition inclining toward said exterior side and being resiliently deformed axially away from said exterior side by said sealing engagement with the interior of said tank, the diameter of said passage through said tubular seal in its undeformed condition decreasing endwise, said tubular seal being resiliently deformed radially outwardly by said sealing engagement with said tube.

9. In the combination according to claim 8, the radial thickness of said body in the undeformed condition at the region of the base of said groove being greater than the axial thickness of said annular seal throughout the major portion of its axial extent, and the latter thickness being comparable to the corresponding radial thickness of said tubular seal.

10. In the combination according to claim 3, said body having an annular fuel receiving channel opening radially inwardly at a location exteriorly of said tank, the end of said body axially opposite said one end thereof comprising an annular outer side of said channel yieldingly engaging said tube in fluid sealing relationship.

11. In the combination according to claim 3, said filler tube extending generally axially through said opening from front to rear with respect to said tank.

* * * * *